(12) United States Patent
Coan et al.

(10) Patent No.: US 8,189,789 B2
(45) Date of Patent: May 29, 2012

(54) INTRUSION-TOLERANT GROUP MANAGEMENT FOR MOBILE AD-HOC NETWORKS

(75) Inventors: Brian A. Coan, Morris Plains, NJ (US); Jonathan Kirsch, Baltimore, MD (US)

(73) Assignee: Telcordia Technologies, Inc., Piscataway, NJ (US)

( * ) Notice: Subject to any disclaimer, the term of this patent is extended or adjusted under 35 U.S.C. 154(b) by 372 days.

(21) Appl. No.: 12/611,493

(22) Filed: Nov. 3, 2009

(65) Prior Publication Data

US 2010/0180116 A1 Jul. 15, 2010

Related U.S. Application Data

(60) Provisional application No. 61/110,743, filed on Nov. 3, 2008.

(51) Int. Cl.
*H04K 1/00* (2006.01)
*H04L 9/08* (2006.01)
(52) U.S. Cl. .......................... 380/273; 380/278; 380/283
(58) Field of Classification Search .................. 380/283, 380/273
See application file for complete search history.

(56) References Cited

U.S. PATENT DOCUMENTS

| | | | |
|---|---|---|---|
| 6,684,331 B1* | 1/2004 | Srivastava | 713/163 |
| 6,901,510 B1* | 5/2005 | Srivastava | 713/163 |
| 6,993,138 B1* | 1/2006 | Hardjono | 380/281 |
| 7,010,125 B2* | 3/2006 | Lotspiech et al. | 380/242 |
| 7,043,024 B1* | 5/2006 | Dinsmore et al. | 380/278 |
| 7,260,716 B1* | 8/2007 | Srivastava | 713/163 |
| 7,383,436 B2* | 6/2008 | Srivastava et al. | 713/163 |
| 7,590,238 B2* | 9/2009 | Kamijoh et al. | 380/45 |
| 7,590,247 B1* | 9/2009 | Dinsmore et al. | 380/278 |
| 7,593,528 B2* | 9/2009 | Kamijoh et al. | 380/45 |
| 7,599,497 B2* | 10/2009 | Soppera | 380/279 |
| 7,698,551 B2* | 4/2010 | Lotspiech et al. | 713/163 |
| 7,760,885 B2* | 7/2010 | Park | 380/283 |
| 7,774,598 B2* | 8/2010 | Chmora et al. | 713/163 |
| 7,813,510 B2* | 10/2010 | Fu | 380/279 |
| 7,925,025 B2* | 4/2011 | Lotspiech et al. | 380/278 |
| 7,957,320 B2* | 6/2011 | Konig et al. | 370/254 |
| 2001/0001014 A1* | 5/2001 | Akins et al. | 380/241 |
| 2002/0147906 A1* | 10/2002 | Lotspiech et al. | 713/158 |

(Continued)

OTHER PUBLICATIONS

Alexander, S., et. als. "The Dynamic Community of Interest and its Realization in Zodiac." IEEE Communications Magazine, vol. 47, No. 10, Oct. 2009, p. 40-47.

(Continued)

*Primary Examiner* — Christian Laforgia
(74) *Attorney, Agent, or Firm* — Philip J. Feig

(57) ABSTRACT

An inventive system and method for intrusion-tolerant group management for a network is presented. The method comprises a client broadcasting a message request to controllers and validating the rekey messages received from the controllers, and controllers validating the client's broadcast message request and broadcasting proposals, collecting proposals, constructing threshold-signed proofs, updating the view umber, performing the client's message request, generating the rekey based on the valid proposals and transmitting the rekey to the client. Simultaneously, controllers send reconciliation messages to all controllers, based on which the membership state is updated. The client updates a shared key when a predetermined number of valid rekey messages are received. The controllers can communicate via a byzantine fault-tolerant agreement. The client can use its public key to decrypt the rekey and perform validation. The client's message request can be a join or a leave.

16 Claims, 4 Drawing Sheets

U.S. PATENT DOCUMENTS

| | | | | |
|---|---|---|---|---|
| 2003/0226013 | A1* | 12/2003 | Dutertre | 713/163 |
| 2003/0233538 | A1* | 12/2003 | Dutertre | 713/151 |
| 2004/0019795 | A1* | 1/2004 | Okaue | 713/189 |
| 2007/0143600 | A1* | 6/2007 | Kellil et al. | 713/163 |

OTHER PUBLICATIONS

Cachin, C., et. als. "Random Oracles in Constantinople: Practical Asynchronous Byzantine Agreement Using Cryptography." Proceedings of the Nineteenth Annual ACM Symposium on Principles of Distributed Computing, Portland, Oregon, Aug. 14, 2000, p. 123-132.

Dutertre, B., et. als. "Intrusion-Tolerant Enclaves." Proceedings of the 2002 IEEE Symposium on Security and Privacy, Oakland, CA, May 2002, p. 216.

Rodeh, O., et. als. "The Architecture and Performance of Security Protocols in the Ensemble Group Communication System: Using Diamonds to Guard the Castle." ACM Transactions on Information and System Security, vol. 4, No. 3, 2001, p. 289-319.

Rodeh, O. et. als. "Using AVL Trees for Fault Tolerant Group Key Management." International Journal on Information Security, vol. 1, 2002, p. 84-99.

Amir, Y., et. als. "Secure Spread: An Integrated Architecture for Secure Group Communication." IEEE Transactions on Dependable and Secure Computing, vol. 2, No. 3, 2005, p. 248-26.

Lamport, L., et. als. "The Byzantine Generals Problem." ACM Transactions on Programming Languages and Systems, vol. 4, No. 3, Jul. 1982, p. 382-401.

Reiter, M.K. "The Rampart Toolkit for Building High-Integrity Services." Lecture Notes in Computer Science, vol. 938: Selected Papers from the International Workshop on Theory and Practice in Distributed Systems, 1994, p. 99-110.

Kihlstrom, K.P., et. als. "The SecureRing Protocols for Securing Group Communication." Proceedings of the IEEE 31st Hawaii International Conference on System Sciences, vol. 3, Kona, Hawaii, Jan. 1998, p. 317-326.

Castro, M., et. al. "Practical Byzantine Fault Tolerance." Proceedings of the 3rd Symposium on Operating Systems Design and Implementation, New Orleans, LA, Feb. 1999, p. 173-186.

Yin, J., et. als. "Separating Agreement from Execution for Byzantine Fault-Tolerant Services." Proceedings of the 19th ACM Symposium on Operating Systems Principles, Bolton Landing, NY, Oct. 2003, p. 253-267.

Martin, J., et. al. "Fast Byzantine Consensus." 2005 International Conference on Dependable Systems and Networks, Yokohama, Japan, 2005, p. 202-215.

Kotla, R., et. als. "Zyzzyva: Speculative Byzantine Fault Tolerance." Proceedings of 21st ACM Symposium on Operating Systems Principles, Stevenson, Washington, Oct. 2007, p. 45-58.

Amir, Y., et als. "Byzantine Replication Under Attack." Proceedings of the 38th IEEE/IFIP International Conference on Dependable Systems and Networks, Anchorage, AK, Jun. 2008, p. 197-206.15.

Lamport, L. "Time, Clocks, and the Ordering of Events in a Distributed System." Communications of the ACM, vol. 21, No. 7, 1978, p. 558-565.16.

Schneider, F. "Implementing Fault-Tolerant Services Using the State Machine Approach: A Tutorial." ACM Computing Surveys, vol. 22, No. 4, 1990, p. 299-319.

Desmedt, Y., et. al. "Threshold Cryptosystems." Crypto '89: Proceedings on Advances in Cryptology, Santa Barbara, CA, 1989, p. 307-315.

Zhou, L., et. al. "Securing Ad Hoc Networks." IEEE Network, vol. 13, 1999, p. 24-30.

Kong, J., et. als. "Providing Robust and Ubiquitous Security Support for Mobile Ad-Hoc Networks." Network Protocols Ninth International Conference on ICNP, Nov. 11-14, 2001, p. 251-260.

Luo, H., et. als. "Self-Securing Ad Hoc Wireless Networks." Seventh International Symposium on Computers and Communications, Jul. 1-4, 2002, p. 567-574.

Narasimha, M., et. als. "On the Utility of Distributed Cryptography in P2P and MANETs: the Case of Membership Control." Eleventh IEEE International Conference on Network Protocols, Nov. 4-7, 2003, p. 336-345.

Saxena, N., et. als. "Efficient Node Admission for Short-Lived Mobile Ad Hoc Networks." Thirteenth IEEE International Conference on Network Protocols, Boston, MA, Nov. 9, 2005, p. 269-278.

Dutertre, B., et. als. "Intrusion-Tolerant Group Management in Enclaves." International Conference on Dependable Systems and Networks, Goteborg, Sweden, Jul. 1-4, 2001, p. 203-212.

Trusted Computing Group, Inc. "Trusted Platform Module (TPM) Specifications." Retrieved from http://www.trustedcomputinggroup.org/specs/tpm/.

Feldman, P. "A Practical Scheme for Non-Interactive Verifiable Secret Sharing," 28th Annual Symposium on Foundations of Computer Science, Los Angeles, CA, Oct. 12-14, 1987, p. 427-437.

Shoup, V. "Practical Threshold Signatures." Lecture Notes in Computer Science, vol. 1807, 2000, p. 207-223.

Rivest, R., et. als. "A Method for Obtaining Digital Signatures and Public-Key Cryptosystems." Communications of the ACM, vol. 26, No. 1, 1983, p. 96-99.

Shamir, A. "How to Share a Secret." Communications of the ACM, vol. 22, No. 11, 1979, p. 612-613.

Kirsch, J., et. al. "Intrusion-Tolerant Group Management for Mobile Ad-Hoc Networks." Tech. Rep. CNDS-2009-2, Johns Hopkins University, 2009. Retrieved from www.dsn.jhu.edu.

Fischer, M., et. als. "Impossibility of Distributed Consensus with One Faulty Process." Journal of the ACM, vol. 32, No. 2, 1985, p. 374-382.

Trusted Computing Group, Inc. "TPM Main Part 2 TMP Structures." TCG Confidential, Specification Version 1.2, Level 2, Revision 103, 2006.

* cited by examiner

FIG. 1

| PROTOCOL STEP | ENTITY TAKING ACTION |
|---|---|
| 1. CLIENT SUBMITS REQUEST TO GROUP CONTROLLERS | JOINING OR LEAVING CLIENT |
| 2. REQUEST VALIDATION | EACH GROUP CONTROLLER THAT RECEIVES THE CLIENT REQUEST |
| 3. GROUP CONTROLLER COORDINATION PROTOCOL | ALL GROUP CONTROLLERS |
| 4. KEY SHARE GENERATION AND DISSEMINATION | EACH GROUP CONTROLLER THAT ACCEPTS THE OPERATION |
| 5. COMBINING OF KEY SHARES, GROUP KEY GENERATION | TRUSTED HARDWARE OF EACH GROUP MEMBER |

FIG. 2

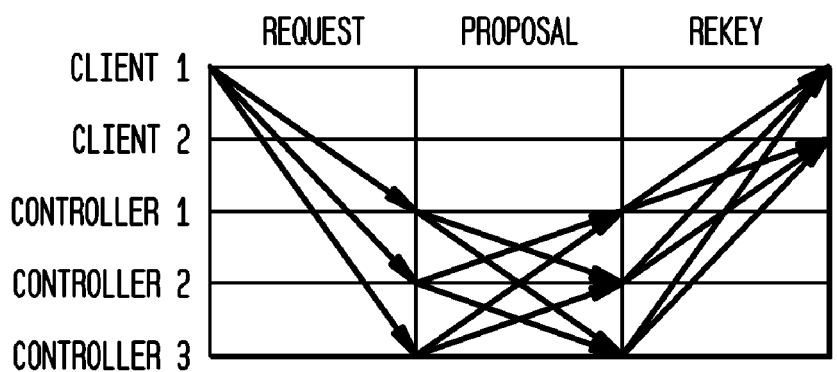

PROTOCOL STRUCTURE

US 8,189,789 B2

INTRUSION-TOLERANT GROUP MANAGEMENT FOR MOBILE AD-HOC NETWORKS

CROSS REFERENCE TO RELATED APPLICATIONS

The present invention claims the benefit of U.S. provisional patent application 61/110,743 filed Nov. 3, 2008, the entire contents and disclosure of which are incorporated herein by reference as if fully set forth herein.

GOVERNMENT LICENSE RIGHTS

This invention was made with Government support under N66001-08-C-2012 awarded by the Defense Advanced Research Projects Agency. The Government has certain rights in this invention.

FIELD OF THE INVENTION

The present invention relates generally to group management for networks.

BACKGROUND OF THE INVENTION

Mobile networks typically have group management systems and/or group communication systems. Group management systems facilitate communication among group members. Several secure group communication systems have been built in the so-called "fortress model," where the group members are assumed to be correct and use cryptography to protect their communication from external attackers. One such system, Ensemble, uses group key distribution protocols to distribute a shared group key, while another, Secure Spread, uses a contributory key agreement protocol in which every group member contributes an equal share of the group secret.

Group communication systems, which also facilitate communication, have been developed in the Byzantine fault model. In this model, faulty processes can fail arbitrarily. For example, the Rampart system and the SecureRing system provide services for membership and ordered message delivery, and they depend on failure detectors to remove faulty processes from the membership. They rely on synchrony for both safety and liveness, since inconsistency can arise if a membership is installed that has one-third or more faulty processes.

Over the last several years, much of the work in Byzantine fault-tolerant agreement has focused on Byzantine fault-tolerant state machine replication (SMR) protocols. In the state machine approach, a group of servers totally orders all updates that cause state transitions, and then the servers apply the updates in the agreed upon order. If the servers begin in the same initial state and the updates are deterministic, the servers will remain consistent with one another. SMR protocols provide strong consistency semantics, but they allow at most one partition to continue executing new updates at a time.

Threshold cryptography has been used to provide security in peer-to-peer and Mobile Ad-hoc Network (MANET) settings, such as the use of threshold cryptography for admission control in malicious environments. In one approach, the current group members run a voting protocol (based on a threshold digital signature scheme) to decide whether or not to admit a potential group member.

SUMMARY OF THE INVENTION

An inventive approach to the need for a robust and highly available group management system, providing services for group membership management, cryptographic key generation, and secure key distribution is presented. Awareness of this need arose as part of work on the DARPA IAMANET (Intrinsically Assurable Mobile Ad-Hoc Networks) program. The novel solution is a group management system that is designed to work in MANETs that might have high packet loss, temporary network partitions, a limited number of compromised processors and a limited number of crashed processors. The agreement protocol of the inventive system allows machines in multiple network partitions to operate in parallel by providing commutative semantics rather than strong consistency, which is desirable in MANETs. However, this novel approach can be applied to wired networks as well.

The inventive system, PICO, is a distributed protocol that manages group membership and keying in MANETs. PICO uses a weakly consistent Byzantine fault-tolerant agreement protocol to provide a partitionable service, and it leverages threshold cryptographic proofs to tolerate message loss and avoid requiring reliable communication links. PICO supports both join and leave operations, and reduces the ratio of correct to faulty processors that is needed.

Applications that use this inventive service can join a group and encrypt messages for one another using the group's shared encryption key, thus facilitating secure communication among group members. In the inventive system, dynamically formed groups of nodes must be able to communicate securely with one another. The system can operate in a MANET with short-lived links, high packet loss, and transient network partitions. It must operate despite a limited number of compromised participants.

A method, system and computer program product for intrusion-tolerant group management for a network having a plurality of controllers is provided. In one embodiment, the method comprises, at a client, broadcasting a message request, validating a rekey message received from a controller of the plurality of controllers, and when the client receives in a predetermined time a predetermined number of the valid rekey messages having a same membership state, updating a shared key and a view number, otherwise rebroadcasting the message request; and, at each controller of the plurality of controllers, performing validation steps based on the message request from the client, when the validation steps are valid, broadcasting a valid proposal to the plurality of controllers, collecting the valid proposals broadcast from the plurality of controllers, when the predetermined number of valid proposals are collected, constructing threshold-signed proof, updating the view number, and performing the message request, generating the rekey message based on threshold-signed proofs constructed by the plurality of controllers, periodically sending a reconciliation message having the membership state, and when the reconciliation message is received, updating the membership state. The client's message request can be a join or a leave.

In one embodiment, the step of validating performed by the client includes decrypting the rekey using a public key on the client. In one embodiment, the controllers communicate via a byzantine fault-tolerant agreement protocol. In one embodiment, the message request is performed in increasing numerical order and the join message request has an odd-numbered identifier, and the leave message request has an even-numbered identifier. In one embodiment, the threshold-signed proof is cumulative. In one embodiment, a sum over all operation numbers in the membership state increases over time, key shares are labeled with a view and use the view number to select key shares for a latest view. In one embodiment, the rekey message is a cryptographic hash of the membership state.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 1 is an outline of the PICO protocol;

FIG. 2 illustrates the basic protocol operation of PICO;

DETAILED DESCRIPTION

Figure 3:
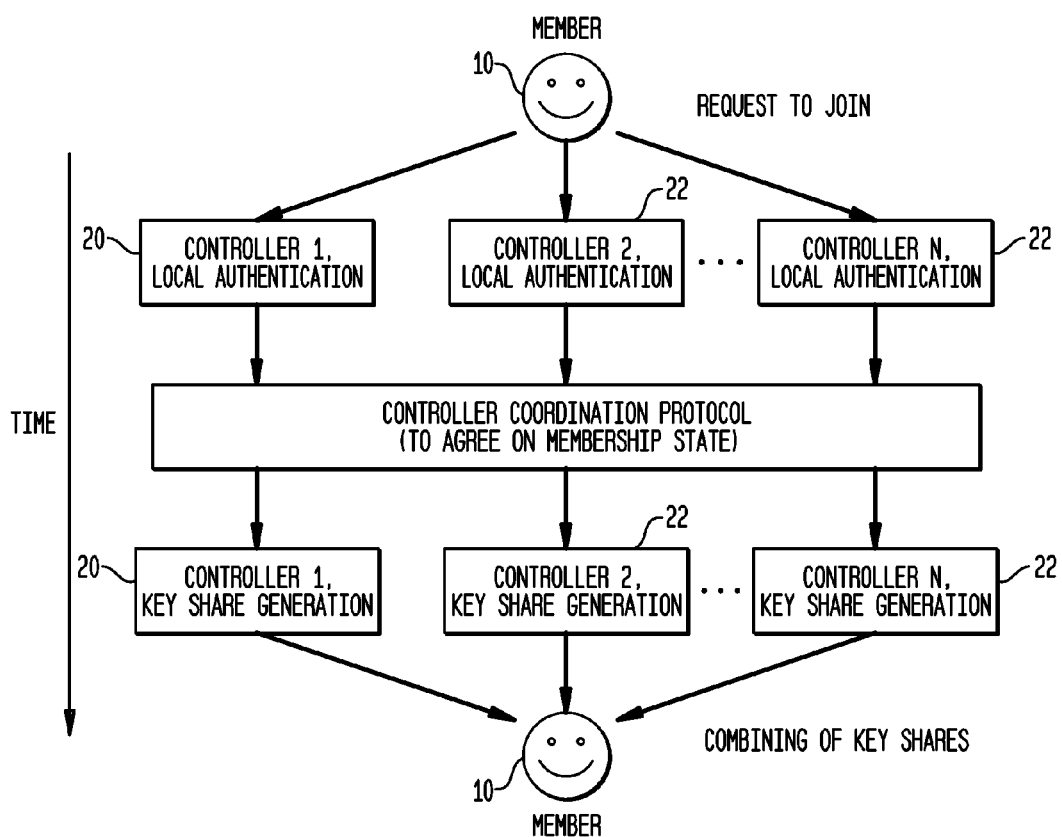
FIG. 3 is a schematic diagram of an embodiment of the present invention.

An inventive approach to the need for a robust and highly available group management system, providing services for group membership management, cryptographic key generation, and secure key distribution is presented. The inventive system allows applications to join and/or leave a logical group and encrypt messages for one another using a dynamically generated symmetric group encryption key. Security against both external and insider attacks is provided. However, functionality to support the sending, retransmission, or ordering of application data messages is beyond the scope of this inventive system. Moreover, this is not a "group communication system" in that it does not attempt to provide the strong membership semantics or the reliable, ordered message delivery of these systems.

The key properties of the inventive system, referred to herein as "PICO", are as follows.

First, PICO uses threshold cryptography to achieve intrusion tolerance. The threshold coin-tossing scheme, as adapted for the group membership problem, can be used to generate the group encryption key, and a threshold digital signature scheme can be used to construct proofs that can be used to verify the messages of PICO participants.

Second, PICO uses limited tamper-proof hardware to assemble shares of the generated group key, hold the generated group key, and use the current group key to encrypt and decrypt traffic. This limited use of trusted hardware prevents a compromised client from divulging the group key to outsiders.

Third, PICO uses a novel Byzantine fault-tolerant agreement protocol to agree on the current group membership. This agreement protocol avoids the need for acknowledgements or queues of undelivered messages in the face of partitions and message loss. PICO uses cumulative threshold cryptographic proofs that allow efficient reconciliation by requiring only the "last" message to be delivered. These proofs also allow a member to know who is in the group at the time it encrypts a message. Only those processors in the group when a message is encrypted can potentially decrypt that message because a change in group membership is tied to a change in the shared group key.

Also, to tolerate a fixed number of benign failures ("b") or crashed processors and another number of Byzantine processors ("f"), PICO needs $b+2f+1$ total processors. By contrast, comparable protocols can require as many as $3b+3f+1$ processors in total.

PICO uses threshold cryptography to implement its security services. PICO also uses a threshold digital signature scheme in which the voting is conducted among group controller processes only. In addition to admission control, PICO provides a coordination protocol for group key generation.

PICO assumes a Byzantine fault model. Processes are correct, crashed, or faulty; correct processes follow the protocol specification, crashed processes simply stop, while faulty processes can deviate from the protocol specification arbitrarily. Processes communicate by passing messages in an asynchronous communication network. Messages can be delayed, lost, or duplicated. An alternative, weaker assumption is that the clients are trusted; PICO also supports this assumption.

Each process has tamper-proof hardware that can hold a public/private key pair and can assemble and verify key shares in the threshold key generation scheme. The process, even if it is Byzantine, cannot read the private key. When a controller sends a key share to a client, the controller encrypts the key share with the public key of the client's hardware, establishing a secure channel between a correct controller and the trusted hardware of the receiving client. The client's hardware decrypts the key share and verifies the correctness proof. When the hardware combines $f+1$ valid key shares, it generates the group encryption key. Clients can use the hardware to encrypt application-level messages using the group key, but they cannot read the group key, even if they are Byzantine. The same physical machine can host both a client process and a controller process.

The network may be divided into multiple partitions. In an infinite execution, there is a partition, P, if (1) P contains a subset (not necessarily proper) of the processes, (2) for any two correct processes a and b in P, if a sends an infinite number of messages to b then b delivers an infinite number of messages from a, and (3) there is some time after which no process in P receives any message from a process outside of P. Although partitions can be defined in terms of properties that hold forever (beginning at some point in the execution), real executions may go through many different partition configurations. In practice, the properties of PICO can be shown to hold in those partitions that last "long enough."

PICO supports secure group communication by generating and distributing a group encryption key. The group services for a group, G, are implemented by a collection of group controller processes. Each group has a fixed number of group controllers, CG, uniquely identified from the set $RG=\{1, 2, \ldots, CG\}$. At most f of the group controllers may be Byzantine. Each group can support an arbitrary but finite number of clients, which communicate with the group controllers to join or leave the group. Clients are uniquely identified from the set $SG=\{1, 2, \ldots\}$. Any number of client processes may be Byzantine.

As discussed in greater detail below, two threshold cryptosystems can be used. First, each group uses an $(f+1, CG)$ threshold digital signature scheme. Each group controller knows one share of the private key, which it can use to generate partial signatures and proofs of correctness. Threshold signatures are assumed to be unforgeable without knowing at least $f+1$ secret shares. Second, each group uses an $(f+1, CG)$ threshold key generation scheme. Each group controller knows one secret share, which it can use to generate key shares and proofs of correctness. It is assumed that one cannot construct the group encryption key without knowing at least $f+1$ key shares. Also the use of a public key infrastructure is discussed in greater detail below.

Coping with Faulty Clients: Like membership and key management systems, PICO must make an assumption about the behavior of client processes. With no assumptions, faulty group members can engage in two behaviors to compromise confidentiality: (1) broadcasting the group encryption key to non-group members, and (2) decrypting application messages using the group key and then re-broadcasting them to non-group members. There are two possible approaches to dealing with this problem. One approach taken, for example by the Intrusion-Tolerant Enclaves protocol, is to assume that all clients are correct, in which case no enforcement is necessary. A different, weaker, assumption, constrains the behavior of faulty clients by requiring that they incorporate a limited trusted computing base.

To cope with the first problem, one can assume trusted hardware for key manipulation, storage, and application. This assumption is reasonable in certain military environments and is likely to become more generally applicable in the future. To cope with the second problem, one can use an approach that leverages host security, virtual machines, and non-bypassable encryption implemented in trusted hardware. PICO can be deployed using either set of assumptions, although some aspects of the protocol (including trusted hardware) are not needed if all clients are assumed to be correct.

PICO makes use of two threshold cryptosystems: a threshold digital signature scheme, used to enforce correct client behavior and facilitate efficient reconciliation, and a threshold key generation scheme, used to generate the shared group key that group members use to encrypt application-level messages for one other. Both cryptosystems and their associated security properties are described. The way in which PICO makes use of a public key infrastructure for simple message signing is also described.

Threshold digital signatures: A (k, n) threshold digital signature scheme allows a set of k out of n processes to generate a digital signature; any set of fewer than k processes is unable to generate a valid signature. When $k \geq f+1$, where f is the maximum number of processes that may be malicious, generating a threshold signature on a message implies that at least one correct process participated in the protocol and assented to the content of the message.

In a typical threshold signature scheme, a private key is divided into n key shares, where each process knows one key share. To sign a message, m, each process uses its key share to generate a partial signature on m. Any process that collects k partial signatures can then combine them to form a threshold signature on m. An important property provided by some threshold signature schemes, especially in malicious environments, is verifiable secret sharing: each process can use its key share to generate a proof of correctness, proving that the partial signature was properly generated using a share from the initial key split.

One embodiment of PICO uses the Shoup RSA threshold digital signature scheme. The signatures generated using this scheme are standard RSA signatures, which can be verified using the public key corresponding to the divided private key. The scheme assumes a trusted dealer to divide the private key and securely distribute the initial key shares (after which the dealer is no longer needed), and it provides verifiable secret sharing.

Threshold key generation: A (k, n) threshold key generation scheme allows a set of k out of n processes to generate a group encryption key, while any set of fewer than k processes is unable to do so. Similar to the case of threshold digital signatures, setting $k \geq f+1$ ensures that the group key was generated using a share from at least one correct process. PICO, in one embodiment, uses the Diffie-Hellman based threshold coin-tossing scheme for key generation, employing the coin-tossing scheme as adapted for the group membership problem. A trusted dealer generates n shares of an initial secret and securely distributes one share to each process (after which the dealer is no longer needed). To generate a group key, each process computes a key share as a function of its secret share and some common state. In PICO, this common state is based on the current group membership. Any process that combines k key shares can combine them to form the group key. The scheme provides verifiable secret sharing, allowing each process to generate a proof that its key share was created using a valid secret share.

Public Key Infrastructure: Each process has a public/private key pair signed by a trusted certification authority. Digital signatures can be employed, and use can be made of a cryptographic hash function for computing message digests. Denote a message m signed by process i as $<m>_{\sigma_i}$. Assume that all adversaries, including faulty controllers and clients, are computationally bounded such that they cannot subvert these cryptographic mechanisms.

A PICO group consists of a collection of clients that share an encryption key, which the clients use to protect their application-level data. This key is dynamically constructed by PICO and is dynamically changed when the group membership changes. A pre-defined set of group controllers is responsible for providing security services to the clients, including handling join and leave requests according to group policy, and distributing shares of the group key to the group members. Each group member is presented with a view of the membership, which is a list of the processes currently in the group. Any change in group membership will be accompanied by a key change.

The PICO architecture is inspired by the architecture of the Intrusion-Tolerant Enclaves protocol. It has the following security goals.

PROPERTY: VALID AUTHENTICATION—Only an authorized client can join the group.

PROPERTY: SECURE-KEYING—If group member i is given f+1 shares for group encryption key k for view v, only the member of v will ever generate k.

PROPERTY: PICO-LIVENESS—Let P be a partition with at least f+1 correct group controllers, where P is stable at time t. Let M be the set of correct clients in P whose last submitted operation is a join. Then there exists a time t'>t after which the members of M share an encryption key.

FIG. 1 presents an outline of the PICO protocol. When a client wants to join or leave the group, it sends a request to the group controllers. If a group controller determines that the request is authorized (i.e., if it approves the request), it proposes that the request be agreed upon by sending a message in the group controller coordination protocol. A controller accepts the requested operation when it becomes agreed upon as a result of the coordination protocol. Once a controller accepts an operation, it updates its view of the group membership and sends a message, containing a share of the group key, to each group member. The message is encrypted with the public key of the trusted hardware of the receiving group member. Each group member combines a threshold number of key shares (in its trusted hardware) to construct the group key.

A critical property of the threshold key generation protocol is that, in order for key shares to be combinable, they must be computed based on some common state. In PICO, the common state on which the controllers compute their key shares is the set of operations, e.g., join and leave requests, that have been accepted. Thus, the group controller coordination protocol must facilitate agreement, among the group controllers, on the set of accepted operations.

Several factors make Intrusion-Tolerant Enclaves unsuitable for use in the PICO environment. First, the coordination protocol is not partitionable. Although it leverages weak semantics to avoid synchrony assumptions, it still requires collecting messages from all correct servers (N−f) in order to guarantee that a new join or leave request can be accepted. Second, a flaw exists in the coordination protocol where, simply due to network asynchrony, there are scenarios in which an authorized client will never be admitted into the group. This flaw is not addressed herein. Finally, the coordination protocol assumes reliable communication links between correct servers; all protocol-level messages must eventually be delivered in order to ensure that all valid operations are eventually agreed upon. Moreover, PICO advantageously reduces the required ratio of correct to faulty processors.

In both Intrusion-Tolerant Enclaves and PICO, key shares are only guaranteed to be combinable when the membership stabilizes. If join and leave requests are continuously submitted too quickly, then there is the potential for livelock if the controllers are unable to converge on the set of accepted operations. This is the price of forgoing the total ordering of SMR. Note, however, that a steady stream of joins and leaves would cause the encryption key to change very rapidly even if SMR were used for coordination. Therefore, in practice these systems must be augmented with mechanisms to rate limit the joins and leaves from both correct and faulty processes. To capture this requirement in PICO, a partition P is defined as stable with respect to time t if no client in P submits a new join or leave request after t. In practice, liveness can be provided during sufficiently long stable periods. PICO guarantees liveness using the PICO-LIVENESS PROPERTY, above.

As mentioned above, the group controllers must agree on the set of operations (join and leave requests) that have been accepted. Operations are uniquely identified by (clientID, operationID) pairs. PICO enforces clients submission of operations with increasing, contiguous operation identifiers, beginning with 1, which must correspond to a join request. As explained below, this prevents faulty clients from prematurely exhausting the space of operation identifiers, and it allows for the use of cumulative threshold-signed proofs for efficient state reconciliation. All valid join operations have odd identifiers, and all valid leaves have even identifiers.

Each controller maintains the state of accepted operations in an array, lastOpsAccepted[ ], where lastOpsAccepted[i] contains the operation identifier of the last operation that the controller has accepted for client i. By agreeing on lastOpsAccepted[ ], the controllers implicitly agree on the current membership of the group: Client i is currently in the group if lastOpsAccepted[i] corresponds to a join operation. In addition, the controllers implicitly agree on the total number of operations that have been accepted for all clients, which is called the view number. As described below, clients use the view number to determine which group encryption key is the most up to date.

FIG. 2 depicts the basic protocol operation of PICO. When a client wants to join or leave the group, it broadcasts a REQUEST message to the group controllers. As described below, although the client broadcasts the REQUEST, PICO provides liveness as long as the message is received by at least f+1 correct controllers in the partition to which the client belongs. The group controllers then exchange PROPOSAL messages to agree to accept the requested operation. Upon accepting the operation, the group controllers send a REKEY message to the client and all current group members.

Client Protocol: When client i wants to join or leave the group, it broadcasts a <REQUEST, opID, proof>$_{\sigma i}$ message to the controllers. The opID field is the operation identifier chosen by the client for this operation. If this request has an operation identifier of 1, then the proof field is empty. Otherwise, proof is a threshold-signed proof that operation (i, opID−1) was legitimately accepted by at least one controller. Thus, to request an operation with identifier j, the client must present proof that operation j−1 was accepted.

After submitting the request, the client waits for f+1 valid REKEY messages from the group controllers, indicating that they have accepted the operation. The responses contain partial signatures that can be combined to generate proof that the operation was accepted. In addition, if the operation was a join request, the responses contain key shares that can be combined to form the group encryption key. The client retransmits its request if it does not receive the necessary replies within a timeout period.

Group Controller Coordination Protocol: Upon receiving REQUEST message r from client i, controller c performs the following validation steps. In each step, if the validation fails, the request is discarded. The steps can include:

1) Verify the signature on r using client i's public key, and consult the group policy to determine if the operation is authorized.

2) If r should contain a proof, confirm that one is present.

3) If r contains a proof, verify it using the group's public key, and confirm that it proves that operation (i, opID−1) was accepted. Note that the public key in question corresponds to the threshold signature that group controllers can generate.

4) If c has already accepted an operation (i, j), j>opID, discard the request, because (i, j) must have already been accepted.

If all of the above checks succeed, then controller c broadcasts a <PROPOSAL, clientID, opID, partialSig>$_{\sigma c}$ message to the rest of the controllers. The clientID and opID fields uniquely identify the requested operation. The partialSig field is a partial signature computed over the hash of the (clientID, opID) pair, along with a proof that the partial signature was computed correctly.

A controller considers a PROPOSAL message as valid if it is properly signed and contains a partial signature with a valid correctness proof. Upon collecting f+1 valid PROPOSAL messages for operation (i, j) from distinct controllers, a controller accepts the operation and takes several steps. First, it combines the partial signatures to construct a threshold signed proof that (i, j) was legitimately accepted. Since this proof is on a single operation, we refer to it as a singleOp proof. As described below, the singleOp proof can be passed to other controllers to convince them that the operation was legitimately accepted. Second, the controller sets lastOpsAccepted[i] to j and updates the view number. Finally, the controller performs the requested operation by either adding client i to, or removing client i from, the membership list.

The group controller coordination protocol (GCCP) meets the following two correctness properties:

PROPERTY: GCCP-VALIDITY—If some correct controller accepts operation (i, j), then some (potentially different) correct controller approved the operation.

PROPERTY: GCCP-AGREEMENT—If some correct controller in partition P accepts operation (i, j), then all correct controllers in P eventually accept the operation.

Observe that the group controller coordination protocol requires a controller to collect only f+1 matching PROPOSAL messages in order to accept an operation, instead of the typical (N−f) messages required by Byzantine fault-tolerant state machine replication protocols and Intrusion-Tolerant Enclaves. The implication of this difference is that PICO guarantees that any partition with at least f+1 correct controllers can accept new join and leave operations, provided there is sufficient connectivity among the controllers and clients. More formally:

PROPERTY: GCCP-LIVENESS—Let P be a partition with at least f+1 correct group controllers. Then if a correct client in P submits an operation (i, j), some correct controller in P accepts the operation.

If N>3f+1, then multiple partitions, operating in parallel, can guarantee the liveness of join and leave requests. The controllers eventually agree on the set of accepted operations. This is a weaker agreement problem than consensus, because controllers never need to make an irrevocable decision; they estimate what the current set is and only need to converge eventually. While this estimation is an accurate answer based on the information currently available, the answer is updated as more information becomes available. The FLP impossibility result applies to protocols in which the processors at some point must make the irrevocable announcement of their final answer. The estimation and updating approach allows PICO to circumvent the FLP impossibility result and guarantee safety and liveness without relying on synchrony.

Rekey Protocol: After accepting an operation, controller c generates a <REKEY, partialSig, lastOpsAccepted, keyShare>$_{oc}$ message. The partialSig field is a partial signature computed over the hash of c's lastOpsAccepted[ ] data structure. There are two cases to consider. If the operation being accepted is a join, then keyShare is a key share computed over the hash of lastOpsAccepted[ ], and the REKEY message is sent to all current group members, including the client that just joined. If the operation being accepted is a leave, then controller c generates two distinct REKEY messages. The first is sent only to the leaving group member and does not contain a key share; this message serves only to allow the leaving member to obtain proof that the leave operation was accepted. The second REKEY message contains a new key share and is sent to all remaining group members. To overcome message loss, a controller periodically retransmits the REKEY messages for its last accepted operation.

A client validates a REKEY message by verifying the signature, along with the proof of correctness of the partial signature and the key share (if one is present). When a client collects f+1 valid REKEYs for the same lastOpsAccepted data, from distinct controllers, it first combines the partial signatures to form a threshold-signed proof reflecting the acceptance of the operation. Since this proof is generated on the array of last accepted operations, it can be referred to as an arrayOp proof. The ith entry of proof p is denoted as p[i]. If the REKEY messages contain key shares, the client combines them to compute the group encryption key. The sum of the entries in the arrayOp proof on which the key shares were computed is referred to as the view number of the key.

The following is a practical problem addressed by the inventive system. Given that client requests are not totally ordered, and that clients collect key shares asynchronously, how does a client know which group encryption key is the most up-to-date? The inventive solution is to leverage the threshold cryptographic proofs already used by the protocol so that a client can choose the correct key by using the one with the highest view number.

Recall that a REQUEST message sent by client i for operation j contains an arrayOp proof, p, where p[i]=j−1. More generally, p[k] contains the last accepted operation for client k at the time the REKEY messages containing the partial signatures combined to form p were generated. Thus, proof p can be viewed as a snapshot of the state of f+1 group controllers, at least one of which is correct. Therefore, a controller receiving a REQUEST message containing p knows that, if p[m]=n, then the operation (m, n) was legitimately accepted in the controller coordination protocol. Further, since we force clients to use contiguous sequence numbers, all operations (m, n'), n'<n, have been legitimately accepted (i.e., the proof is cumulative).

The preceding discussion implies that group controllers can use the proofs contained in REQUEST messages to perform reconciliation on the set of accepted operations. Upon receiving a <REQUEST, opID, p>$_{oi}$ message from client i, a controller performs the following two steps (in addition to those described above). First, for each client k, the controller sets lastOpsAccepted[k] to max(lastOpsAccepted[k], p[k]). Thus, the controller applies the arrayOp proof to its data structures. Second, if any entry in lastOpsAccepted[ ] changed, the controller updates the view number and membership list, and it computes a new REKEY message. In addition, a rule is imposed so that a client only processes a REKEY message if the view number implied by the lastOpsAccepted field is higher than the view number of the last group key it adopted.

Each group member periodically broadcasts the arrayOp proof corresponding to its current group key in a reconciliation message, <RECONC, proof>$_{oi}$. When a controller receives a RECONC message, it applies the proof to its data structures and generates a new REKEY message if it learned of new accepted operations. Thus, when client c moves from one partition to another, it carries with it the snapshot, i.e., the proof, corresponding to key it is currently using. Eventually, the clients in the new partition will either adopt a key with the same view number as the one c was using (in which case they will install the exact same membership as c) or a greater view number (in which case they all converge on a new membership). This property is formalized as:

PROPERTY: REKEY-FORWARD-PROGRESS: Let P be a partition with at least f+1 correct group controllers. If a correct client in P ever successfully generated a group key with view number v, then there exists a time after which each correct group controller in P only sends REKEY messages corresponding to a view number v'≧v.

FIG. 3 shows a schematic diagram of an embodiment of the inventive system in which a client or member 10 wants to join the MANET which has multiple, group controllers 20. The client 10 sends a request to join to the group controllers 20. The controller coordination protocol is executed to agree on a membership state. The group controllers 20 undertake key share generation and the client or member 10 combines the key shares.

Figure 4:
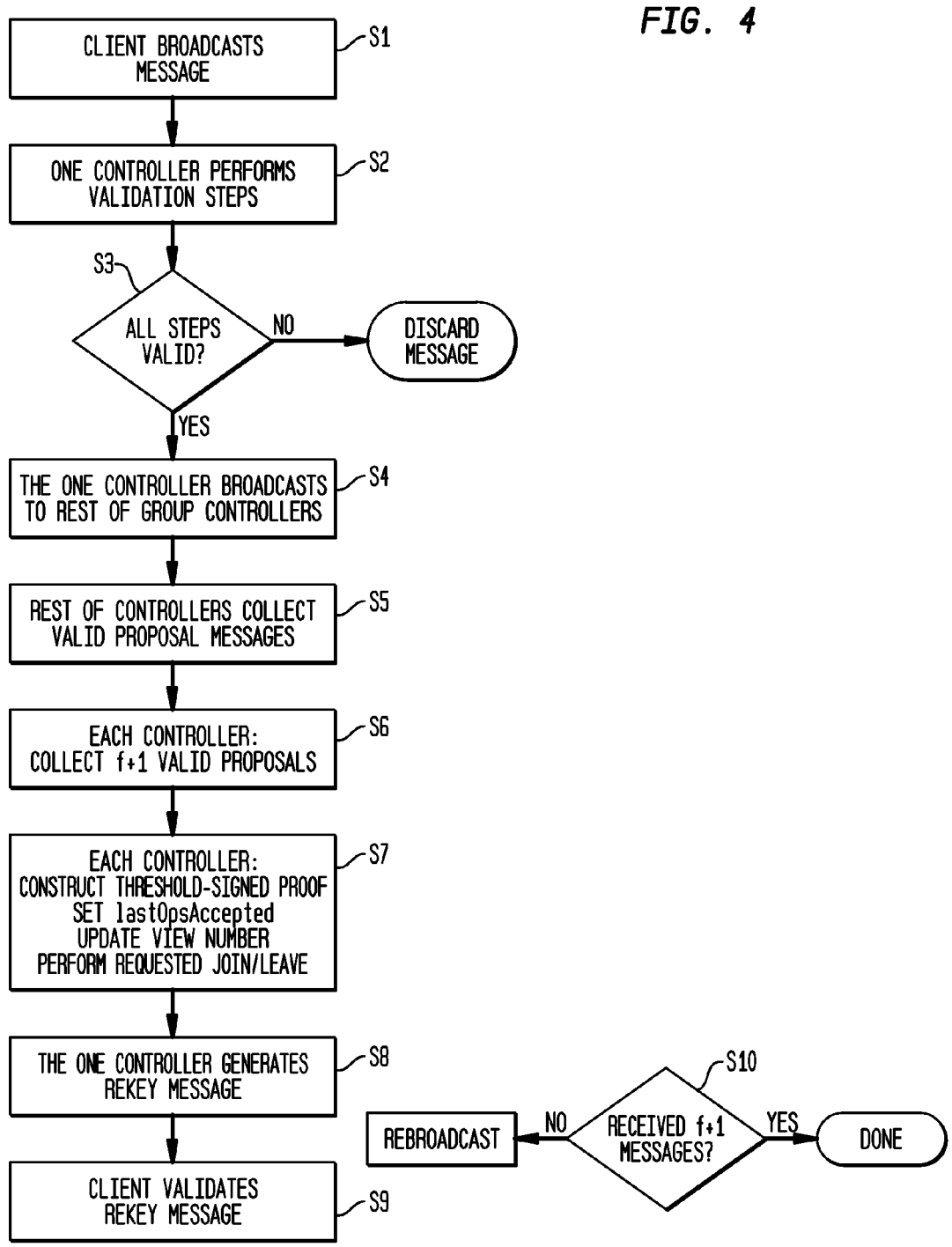
FIG. 4 is a flow diagram of an embodiment of the present invention.

Operation of an exemplary embodiment is shown in the flow diagram of FIG. 4. In step S1, a client 10 broadcasts a message, indicating it wants to join or leave the group, to the group controllers 20. In step S2, each controller 20 performs validation steps. These steps, which are described above, include verifying the client's signature, confirming a proof is present and, if so, verifying the proof, and determining whether the request has previously been accepted. If any validation step fails (S3=NO), the request is discarded. Otherwise (S3=YES), in step S4, each controller 20 broadcasts a proposal message to the controllers 20 in the group. Each controller 20 collects valid proposal messages in step S5. When a controller 20 has collected f+1 valid proposals, in step S6, it accepts the operation. In step S7, each of the controllers 20 constructs a threshold-signed proof, sets the lastOpsAccepted to j, where j is the client-specific operation identifier or number of the most recent operation that the controller has accepted, updates the view number, and performs the client's request of either join or leave. In step S8, each controller 20 generates a REKEY message; the message is transmitted, and can be retransmitted periodically to overcome message loss. In step S9, the client 10 receives and validates the REKEY messages from the controllers 20. If the client 10 has received f+1 valid REKEY messages corresponding to the same membership state (S10=YES), the client 10 recognizes that the operation is accepted, and the client 10 assembles the key in the trusted hardware. If the necessary replies are not received within a timeout period (S10=NO), the client 10 re-broadcasts or retransmits its request.

Simultaneously, each controller 20 periodically sends a RECONC or reconciliation message to the other controllers in the group, in step S11. There is no need for explicit acknowledgment of these messages. The RECONC message reflects the membership state, including the view number, and provides proof of membership, indicating whether a client is IN or OUT of the group. The proof shows that each element has the signature of the group, which has been constructed by combining f+1 threshold signatures on that element. In step S12, the RECONC message is received by all of the group controllers 20.

Table 1 shows messages used by PICO. These messages include JOIN, LEAVE, PROPOSE, RECONC, and REKEY. Join and Leave are broadcast from a member or client 10 to the group controllers 20. When a controller 20 thinks a join or leave operation is authorized, the controller 20 sends a PROPOSE message to the other controllers 20. To synchronize the membership state among group controllers, a RECONC message is transmitted from a controller 20 to the group controllers. To give a member 10 a share of the current group key, a controller 20 transmits a REKEY message to the member 10.

array [5, 4, 1, 0] (with a view number of 10). Client 2 is not currently a member of the group, and last had a group key corresponding to [5, 3, 1, 0] (with a view number of 9). Client 2 has an arrayOp proof corresponding to [5, 4, 1, 0], which it collected after completing the operation (2, 4), i.e., after it left the group. Clients 3 and 4 are in partition B and are using a group key corresponding to the array [0,1,1,1] with a view number of 3.

Now suppose client 2 moves to partition B. We would like the client to be able to share a group key with clients 3 and 4. Since client 2 was last using a group key with view number 9 in partition A, it must have an arrayOp proof, p, corresponding to a key with a view number of at least 9. In this case, p consists of the array [5, 4, 1, 0] and a corresponding threshold signature. When client 2 requests to join in partition B, its REQUEST message contains p. After applying p, the controllers in partition B will update their view number to 11, since they compute the maximum of each slot in the array. Thus, when client 2's new join request is accepted, it will compute a group key based on the array [5, 5, 1, 1], which has a view number of 12. In addition, clients 3 and 4 receive the corresponding REKEY messages (since they are members of the group) and will adopt the same group key.

The constraints imposed by the MANET environment dictate that PICO should meet two important properties. First, it should not rely on reliable communication links. Given that message loss can be high and partitions long-lived, reliable links would consume bandwidth with acknowledgements and would require unbounded message queues. Second, PICO must provide efficient reconciliation when two partitions

TABLE 1

| Message Name | From | To | Purpose | Contents |
|---|---|---|---|---|
| JOIN or LEAVE | Member | Controller | Request to join or leave the group | Signed request giving member and operation plus proof that the prior operation completed. If the Controller thinks the request is OK, it sends a PROPOSE message |
| PROPOSE | Controller | Controller | Statement that this controller thinks a join or leave operation is authorized | Controller's threshold signature on the requested operation. When any controller gets f + 1 matching threshold signed PROPOSE messages, it combines to get a real signature on the operation |
| RECONC | Controller | Controller | Synchronize membership state among group controllers | "Proof" of a controller's current membership state, where "Proof" means that everything has a "real" signature |
| REKEY | Controller | Member | Give member a share of the current group key | The key share, and a "proof" of the membership state that the key share matches. Member can combine f + 1 shares. Member needs the proof when it submits its next operation |

Figure 5:
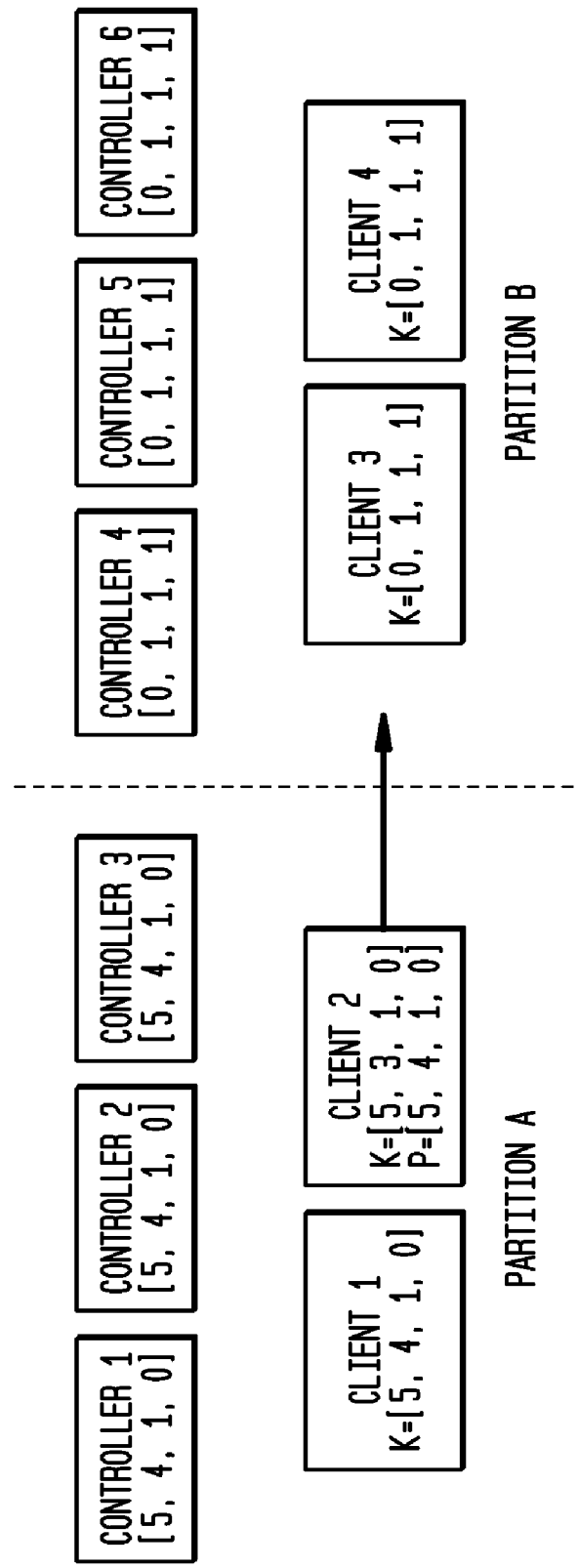
FIG. 5 depicts a PICO system with six group controllers and four clients.

To help elucidate the intuition behind the mechanism described above, an example is provided. FIG. 5 depicts a system with four clients 10, where the network is split into two partitions, A and B. Suppose all controllers 20 in A agree on the set of accepted operations (with a lastOpsAccepted array of [5, 4, 1, 0]), all controllers in B agree on a different set of accepted operations ([0, 1, 1, 1]), and no new join or leave requests are submitted. Clients 1 and 2 are currently in partition A. Client 1 is using a group key corresponding to the merge. Again, since partitions can be long-lived, PICO should specifically avoid passing all of the operations that were accepted in one partition to the other partition when the network heals.

The use of the threshold-signed proofs already in PICO to build a simple and efficient reconciliation and garbage collection mechanism is described. Each group controller maintains a data structure called a Reconciliation Vector, or RV. The RV is simply an array of proofs, where RV[i] contains the proof reflecting the latest accepted operation for client i. For convenience, the operation identifier of this operation is denoted as RV[i].opID. Note that a proof might be a singleOp proof or an arrayOp proof. A singleOp proof can be constructed during the group controller coordination protocol, and an arrayOp proof can be constructed by a client during the rekey protocol and passed to the controller in either a REQUEST or a RECONC message.

Each controller, c, periodically broadcasts the contents of its RV, wrapping each proof, p, in a <RECONC, p>$_{oc}$ message. Upon receiving a RECONC message, a controller applies p, updating RV and lastOpsAccepted[ ] if p reflects more knowledge than what it currently has in its data structures. More formally, if p is a singleOp proof for operation (i,j), then if j>lastOpsAccepted[i], the controller replaces RV[i] with p and sets lastOpsAccepted[i] to j. If p is an arrayOp proof, then for each slot k in p, if p[k]>lastOpsAccepted[k], then the controller sets RV[k] to p and lastOpsAccepted[k] to p[k].

Since proofs are cumulative, PICO requires only the last reconciliation message to be received for each client in order to reconcile all of that client's accepted operations. This facilitates efficient reconciliation when two partitions merge; rather than requiring state proportional to the number of operations that were accepted in each partition to be transferred, each controller must transfer at most one message per client (multiple slots may have the same proof, which can be sent only once). This also makes the coordination protocol tolerant of message loss: once any correct controller in a partition, P, collects f+1 PROPOSAL messages for an operation, (i, j), all subsequent PROPOSAL messages for (i, j) need not be delivered in order for all controllers in P to accept it.

Observe that PICO avoids the need for unbounded message queues. Each controller must retransmit at most one proof per client, and old PROPOSAL messages do not need to be reliably delivered. Thus, garbage collection in PICO is implicit and is done simply by updating the RV and discarding PROPOSAL messages for operations (i, j) if RV[i].opID>j. In contrast, protocols requiring reliable links operating in a partitionable environment would require an explicit garbage collection mechanism to determine which messages had been delivered to all processes and could be deleted.

PICO can be extended to support the ejection (irreversible revocation) of both controller and client processes.

First consider the ejection of faulty clients, and assume that some trusted entity generates and signs an ejection message, which contains the process identifier of the client being ejected. This entity can be made fault-tolerant via threshold cryptographic techniques. Ejection messages impact whether or not (1) a controller sends REKEY messages to a client, and (2) a controller processes a REQUEST message from a client. A correct controller never sends a REKEY message to a client it knows to be ejected, and it ignores subsequent REQUEST messages from clients it knows to be ejected.

Note, however, that correct controllers continue to accept join and leave operations for ejected clients when knowledge of these operations comes from any other source, i.e., in proofs received from other processes. In this way, the ejection does not impact the properties guaranteed by the rest of the protocol. The join/leave status agreed upon for an ejected client does not matter because clients are treated as group members only if (1) their last operation is a join and (2) they have not been ejected.

Group controllers within a partition must also converge on the set of ejected processes (in addition to the set of accepted operations). To facilitate this convergence, ejection messages can be periodically transmitted by extending the Reconciliation Vector to include the ejection status of each process.

PICO supports the ejection of group controllers in the same way. A correct process will ignore messages sent by an ejected controller. However, if too many group controllers are ejected, then PICO will no longer guarantee liveness. That is, PICO only guarantees liveness in partitions with at least f+1 correct (i.e., not faulty and not ejected) controllers.

Some implementation and performance considerations of PICO are noted. First, an evaluation of the cryptographic overhead of the implementation is presented. Next, a simple optimization that can be used to reduce the computational load is presented.

One implementation can be written in C and use the OpenSSL library. The latency of the different types of cryptographic operations are measured when running on a 3.2 GHz, 64-bit Intel Xeon computer. Each computer can generate a 1024-bit standard RSA signature in 1.3 ms and verify a signature in 0.07 ms.

Threshold RSA Signatures: As described above, a group controller combines f+1 partial signatures when it accepts an operation, and a client combines f+1 partial signatures when its operation completes. For example, the OpenTC implementation of Shoup's threshold RSA signature scheme can be used. The cost of generating a partial signature, along with its proof of correctness, was measured to be 3.9 ms. This cost remains fixed as the number of tolerated faults increases, because the number of exponentiations required to compute the partial signature remains the same. On the other hand, the cost of combining f+1 partial signatures grows as f increases. Optimization for the common-case operation can be done by attempting to combine partial signatures without first verifying their correctness proofs. If the resulting threshold signature verifies, then the shares were correct. However, if the signature does not verify, then each proof can be checked to detect which shares were invalid. Since all messages are digitally signed, the invalid share can be broadcast as a proof that the corresponding controller is compromised, and the controller can subsequently be blacklisted. Using this technique, we measured the latency for combining to be 1.3 ms when f=1, 2.1 ms when f=3, and 3.4 ms when f=5.

Threshold Key Generation: We implemented the threshold key generation scheme of Cachin, Kursawe, and Shoup (C. Cachin, K. Kursawe, and V. Shoup, "Random Oracles in Constantinople: Practical asynchronous byzantine agreement using cryptography (extended abstract)," in *Proceedings of the nineteenth annual ACM symposium on Principles of distributed computing (PODC '00)*, Portland, Oreg., 2000, pp. 123-132). We generated a 1024-bit safe prime and performed operations in its prime order subgroup. We measured the cost of generating a key share in this setting to be 11.3 ms. This cost is independent of the number of tolerated faults. The cost of combining the key shares into the group key increases as f increases. We measured the latency for combining to be 23.7 ms when f=1, 50 ms when f=3, and 91 ms when f=5.

Aggregating Membership Changes: In many settings, join and leave operations are not likely to require real-time latencies. Therefore, we believe the latencies presented above are likely to be acceptable for many applications. Nevertheless, if membership changes are frequent, the cost of generating and combining partial signatures and key shares can become high. To help reduce this cost, a controller can aggregate several membership change operations before generating a REKEY message, which contains its partial signature and key share. This amortizes the cryptographic cost over several operations, reducing the average load per operation.

Proof Strategy: We first prove PROPERTY GCCP-AGREEMENT and PROPERTY GCCP-LIVENESS of the group controller coordination protocol. Using these properties, we prove Lemma 8.1, which states that all correct controllers in a stable partition eventually converge on the set of accepted operations (i.e., their lastOpsAccepted[ ] data structures become identical). Once the correct controllers converge, we prove PROPERTY REKEY-FORWARD-PROGRESS, which shows that correct controllers will eventually generate REKEY messages for a view number that will be adopted by the correct group members. The liveness of the overall PICO protocol, PICO-LIVENESS (Property 5.3), follows directly from these two properties.

Proof of GCCP-Agreement: When a correct controller, c, in partition P accepts operation (i, j), it obtains a proof, p, that (i, j) was legitimately accepted. We must show that all correct controllers in P eventually accept (i, j). If c never accepts a later operation for i, then it continues to periodically retransmit p, which will eventually be received by all correct controllers in P. If c does accept a later operation for i, it will replace RV[i] with a new proof, p', for some operation (i, j'). In turn, c may replace p' with a later proof, p'', and so on. Eventually, a correct controller will receive one of these proofs (call it p*, for operation j*), at which point it will implicitly accept all operations (i, j'') with j''≦j*, including (i, j), because proofs are cumulative.

Proof of GCCP-Liveness: We must show that if client i submits request (i, j) in a partition, P, with at least f+1 group controllers, then (i, j) will eventually be accepted. Client i periodically retransmits the request until it receives proof that (i, j) was accepted. The request is eventually received by at least f+1 correct group controllers, each of which will approve it and send a PROPOSAL for (i, j). Each correct controller thus eventually receives at least f+1 valid PROPOSALs from distinct controllers and will therefore accept the operation.

Lemma 8.1: Let P be a partition with at least f+1 correct group controllers, where P is stable at time t. Then all correct group controllers in P eventually agree on the set of accepted operations.

Proof of Lemma 8.1: Since P is stable, no new join or leave requests are submitted. By GCCP-LIVENESS, any pending operation from a correct client will eventually be accepted by some correct controller in P, and by GCCP-AGREEMENT, all correct controllers will eventually accept these operations. If any pending operation from a faulty client is accepted by a correct controller, all correct controllers in P will accept it.

For each client i, let $i_c$ be the highest operation identifier for which a correct process in P has a proof, and let $i_f$ be the highest operation identifier for which a faulty process in P has a proof. If $i_c \geq i_f$, then let r be a correct process in P that has proof that (i, $i_c$) was accepted. Any other correct controller, s, will eventually accept this operation because r continues to retransmit the proof.

If $i_f > i_c$, then for each operation j, with $i_c < j \leq i_f$, a faulty process can either choose to make the proof of (i, j) known to a correct process (in which case it will be accepted by all correct controllers) or it never makes the proof known. Thus, there exists some maximum such j that a faulty process makes known, which implies that the correct controllers eventually agree on the set of operations for which only faulty processes had proof of acceptance. Therefore, the correct controllers eventually agree on the set of accepted operations for each client.

Proof of Rekey-Forward-Progress: By Lemma 8.1, all correct group controllers in partition P eventually agree on the set of accepted operations. When each correct controller in P accepts the last operation, it generates a REKEY message with a key share based on the same membership as each other correct controller in P. Let $v_{final}$ be the view number implied by the lastOpsAccepted field, L, of these REKEY messages. We must show that $v_{final}$ will be at least as high as the view number, v, of the key currently being used by any of the correct group members. We can prove this by showing that no correct group member has proof of an operation (i, j) where j>L[i]. The proof is by contradiction. If any correct group member had this proof, then it would eventually be received in a RECONC message by a correct controller, which would cause the controller to increase its view number and generate a REKEY message with a higher view number, which violates the assumption that $v_{final}$ is the convergence point established by Lemma 8.1.

Proof of PICO-Liveness: By Lemma 8.1, all group controllers in a partition P Eventually converge on the set of accepted operations and generate a REKEY message based on the same membership. Since there are at least f+1 correct controllers in P, and since correct controllers periodically retransmit their last REKEY message, all correct group members will eventually collect f+1 combinable REKEY messages based on the stable membership. By Property 6.4, the view number of this key, $v_{final}$, will be at least as high as the one currently being used by any correct group member. Any group member in M that previously had a group key with a view $v < v_{final}$ will adopt the group key corresponding to $v_{final}$. Any group member already using a key with a view number $v = v_{final}$ must already be using this group key, since otherwise there exists some operation that has not been converged upon. Since the convergence view is $v_{final}$, no correct controller sends a REKEY message corresponding to a higher view number, so all members of M will continue using the established group key.

Proof Strategy: We first prove GCCP-VALIDITY (Property 6.1), the validity property of the group controller coordination protocol. We then use this to prove VALID-AUTHENTICATION (Property 5.1), which states that only authorized clients are able to join the group. Finally, we prove SECURE-KEYING (Property 5.2), the security of the keying process.

Proof of GCCP-Validity: A correct controller accepts an operation (i, j) after (1) collecting f+1 PROPOSAL messages, (2) collecting a singleOp proof for operation (i, j), or (3) collecting an arrayOp proof p with p[i]≧j. In the first case, since at most f controllers are faulty, at least one correct controller sent a PROPOSAL and therefore approved the operation. In the second case, a singleOp proof is constructed by collecting f+1 PROPOSAL messages, each with a partial signature on the hash of (i, j). Again, since at most f controllers are faulty, at least one correct controller must have sent a PROPOSAL message that contributed to the construction of the singleOp proof.

In the third case, the arrayOp proof was constructed by collecting f+1 REKEY messages. In each message, the $i^{th}$ entry of the lastOpsAccepted field contained j'≧j. Thus, at least one correct controller had lastOpsAccepted[i]=j'. In order for (i, j') to have been accepted, client i must have submitted a REQUEST containing proof that (i, j'−1) was accepted; which implies that at least one correct controller had lastOpsAccepted[i]=j'−1. Using a simple induction, each operation from (i, 1) through (i, j') was accepted by at least one correct controller, including (i, j). Consider the first correct controller to accept (i, j). This controller must have done so through either Case 1 or Case 2, since no arrayOp proof, p, with p[i]≧j, can yet exist. By Case 1 and Case 2 above, some correct controller must have sent a PROPOSAL message for (i, j).

Proof of Valid-Authentication: By GCCP-VALIDITY, a client can only join the group if its operation was approved by some correct controller. A correct controller consults group policy in deciding whether to approve a client join request. Thus, only an authorized client can join the group.

Proof of Secure-Keying: We show that only members of a given view, v, can generate the group key k. Group member i uses its trusted hardware to encrypt messages with k. When i adopted k, it obtained an arrayOp proof, p, from which the current group view can be deduced. To obtain k, a process must combine f+1 key shares all based on the same lastOpsAccepted data, which is the same data as in p. A correct controller only sends a REKEY message containing a key share to the members of v. Each REKEY is encrypted with the public key of the trusted hardware of the receiving group member. Thus, a faulty client not in v will never be sent the necessary f+1 REKEY messages. Faulty clients cannot decrypt the key shares of REKEY messages sent to correct clients. Further, since they cannot learn the decryption key of their own trusted hardware, even faulty group members cannot divulge their own key shares to processes not in v. The security of the keying process thus follows from the fact that only processes in v are able to generate k, and no process is able to learn k.

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

What is claimed is:

1. A method for intrusion-tolerant group management for a network having a plurality of controllers, said method comprising steps of:
   at a client:
      broadcasting a message request;
      validating a rekey message received from a controller of the plurality of controllers; and
      when the client receives in a predetermined time a predetermined number of the valid rekey messages having a same membership state, updating a shared key and a view number, otherwise rebroadcasting the message request;
   at each controller of the plurality of controllers:
      performing validation steps based on the message request from the client;
      when the validation steps are valid, broadcasting a valid proposal to the plurality of controllers;
         collecting the valid proposals broadcast from the plurality of controllers;
         when the predetermined number of valid proposals are collected,
            constructing threshold-signed proof;
            updating the view number; and
            performing the message request,
      generating the rekey message based on threshold-signed proofs constructed by the plurality of controllers;
      periodically sending a reconciliation message having the membership state; and
      when the reconciliation message is received, updating the membership state, wherein the membership state comprises at least the view number.

2. The method according to claim 1, wherein the step of validating performed by the client includes decrypting the rekey using a public key on the client.

3. The method according to claim 1, wherein the plurality of controllers communicate via a byzantine fault-tolerant agreement protocol.

4. The method according to claim 1, wherein the message request is one of a join and a leave.

5. The method according to claim 4, wherein the message request is performed in increasing numerical order and the join has an odd-numbered identifier for the message request and the leave has an even-numbered identifier for the message request.

6. The method according to claim 1, wherein the threshold-signed proof is cumulative.

7. The method according to claim 1, wherein a sum over all operation numbers in the membership state increases over time, key shares are labeled with a view and use the view number to select key shares for a latest view.

8. The method according to claim 1, wherein the rekey message is a cryptographic hash of the membership state.

9. A computer program product for a network having a plurality of controllers, comprising:
   a non-transitory storage medium readable by a processor on a client and storing instructions for execution by the processor on the client for performing a method comprising:
      broadcasting a message request;
      validating a rekey message received from a controller of the plurality of controllers; and
      when the client receives in a predetermined time a predetermined number of the valid rekey messages having a same membership state, updating a shared key and a view number, otherwise rebroadcasting the message request; and
   a storage medium readable by processors on the plurality of controllers and storing instructions for execution by the processors on the plurality of controllers for performing a method comprising:
      performing validation steps based on the message request from the client;

when the validation steps are valid, broadcasting a valid proposal to the plurality of controllers;
  collecting the valid proposals broadcast from the plurality of controllers;
  when the predetermined number of valid proposals are collected,
    constructing threshold-signed proof;
    updating the view number; and
    performing the message request,
generating the rekey message based on threshold-signed proofs constructed by the plurality of controllers;
periodically sending a reconciliation message having the membership state; and
when the reconciliation message is received, updating the membership state, wherein the membership state comprises at least the view number.

10. The computer program product according to claim 9, wherein the step of validating performed by the client includes decrypting the rekey using a public key on the client.

11. The computer program product according to claim 9, wherein the plurality of controllers communicate via a byzantine fault-tolerant agreement protocol.

12. The computer program product according to claim 9, wherein the message request is one of a join and a leave.

13. The computer program product according to claim 12, wherein the message request is performed in increasing numerical order and the join has an odd-numbered identifier for the message request and the leave has an even-numbered identifier for the message request.

14. The computer program product according to claim 9, wherein the threshold-signed proof is cumulative.

15. The computer program product according to claim 9, wherein a sum over all operation numbers in the membership state increases over time, key shares are labeled with a view and use the view number to select key shares for a latest view.

16. The computer program product according to claim 9, wherein the rekey message is a cryptographic hash of the membership state.

\* \* \* \* \*